Sept. 17, 1929. B. C. VON PLATEN ET AL 1,728,644
REFRIGERATION
Filed June 18, 1927 8 Sheets-Sheet 7

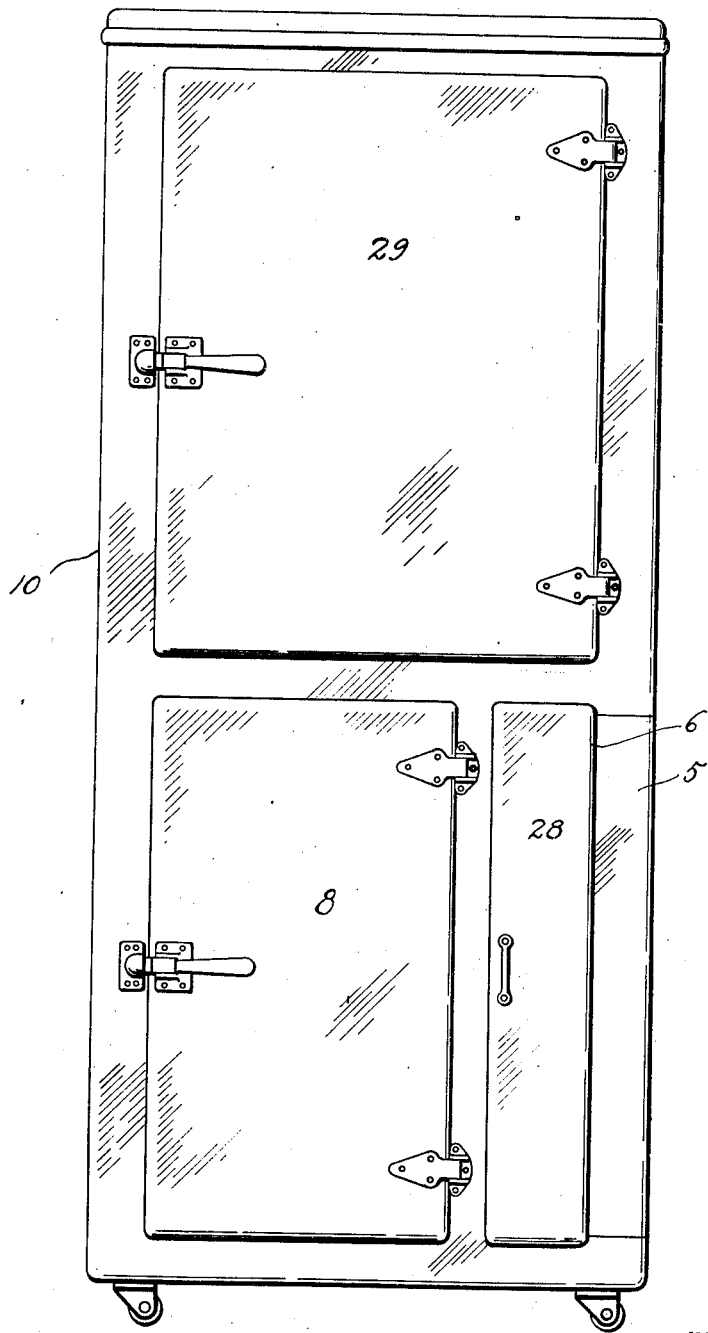

Patented Sept. 17, 1929

1,728,644

UNITED STATES PATENT OFFICE

BALTZAR CARL VON PLATEN AND CARL GEORG MUNTERS, OF STOCKHOLM, SWEDEN, ASSIGNORS TO ELECTROLUX SERVEL CORPORATION, OF NEW YORK, N. Y., A CORPORATION OF DELAWARE

REFRIGERATION

Application filed June 18, 1927, Serial No. 199,674, and in Germany December 28, 1926.

Our invention relates to the art of refrigeration and more specifically to that branch of the art which pertains to refrigerating apparatus and cabinets for domestic use. The particular type of apparatus which this invention includes in its subject matters operates on what is commonly known as the absorption principle and employs an inert gas to make possible a condition of constant pressure throughout the entire system.

Domestic refrigerators, because of the limitations often placed on the size of the cabinet, should be so designed that the apparatus therein occupies a minimum space in order that a maximum space remains for food storage. Furthermore, it is desirable that the apparatus be properly arranged in relation to the food compartment so that the latter may not only be as spacious as possible but that all the space therein be conveniently available for the storage of food. Another feature of value of a refrigerator is continuous and definite circulation of cold air within the food compartment in order that a low temperature may be maintained in those parts of the interior of the cabinet which are more or less remote from the chilling unit. In this connection, the interior should preferably be designed so as to prevent the formation of pockets of stagnant air in one or more places even though there is a strong circulation of the rest of the air. It is an object of our invention to provide a refrigerator combining these and other desirable features and in the attainment of this object our invention contemplates a tall, narrow apparatus, the greater part of which fits conveniently into two narrow compartments formed in one side of the cabinet. The chilling unit is conveniently placed in the upper part of the cabinet along one of the sides. Two great advantages accrue from this location: first, a definite circulation of air within the cabinet is established; and second, all the space adjacent to the chilling unit in the upper part of the cabinet is available for food storage.

Although the apparatus is tall and narrow, it is nevertheless of very rigid construction. There are two comparatively large upright members joined together by several cross members and as all members are tubular and welded to each other, a very strong structure results. The apparatus is supported at its more central part by a partition between the two apparatus compartments and at its upper part by one of the walls of the cabinet and is so arranged as to be easily removable. A more detailed description of the manner in which our invention accomplishes these, as well as other results and advantages, will appear in the following specification, taken in reference to the accompanying drawings, of which:

Fig. 9 shows a front elevational view of the outside of the cabinet.

Figure 1:
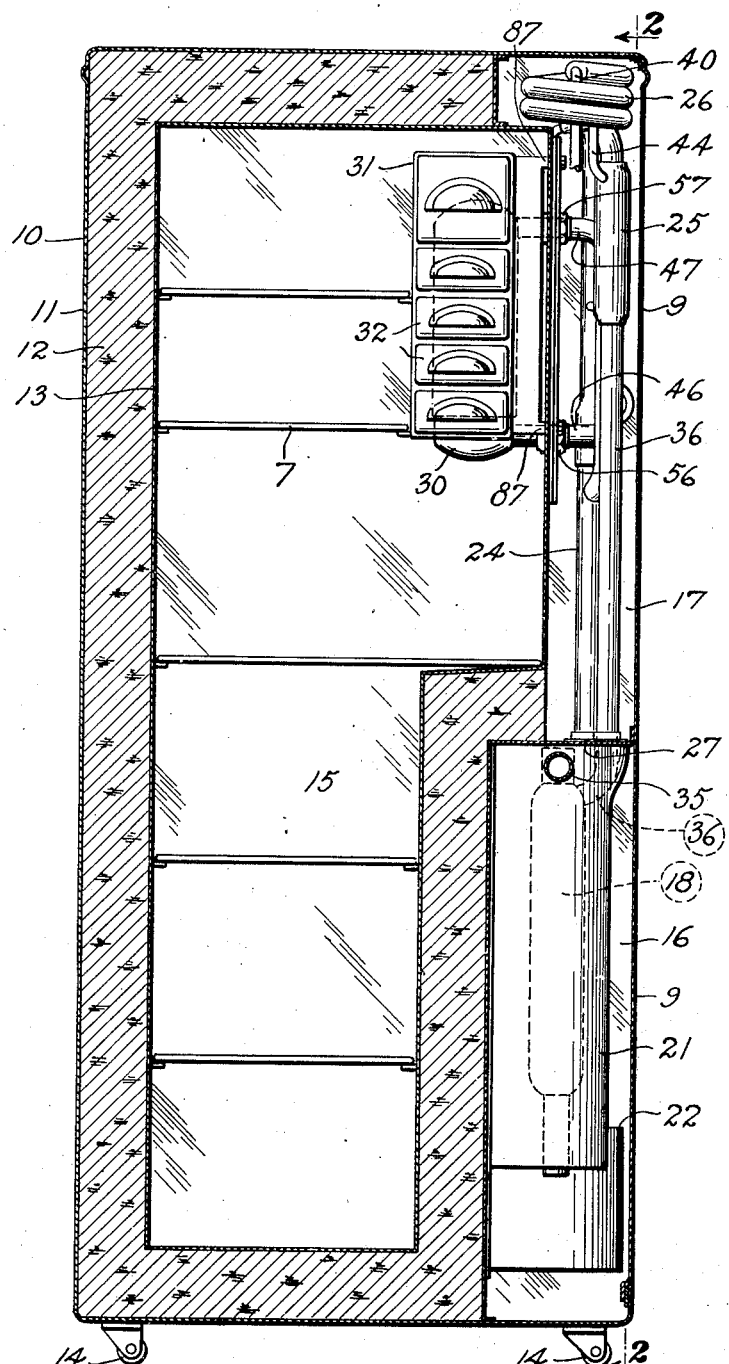
Fig. 1 shows a front, elevational view, partially in cross section of a refrigerator comprising a preferred form of cabinet and apparatus according to our invention, the section being taken substantially on the line 1—1 of Fig. 2.
Figure 2:
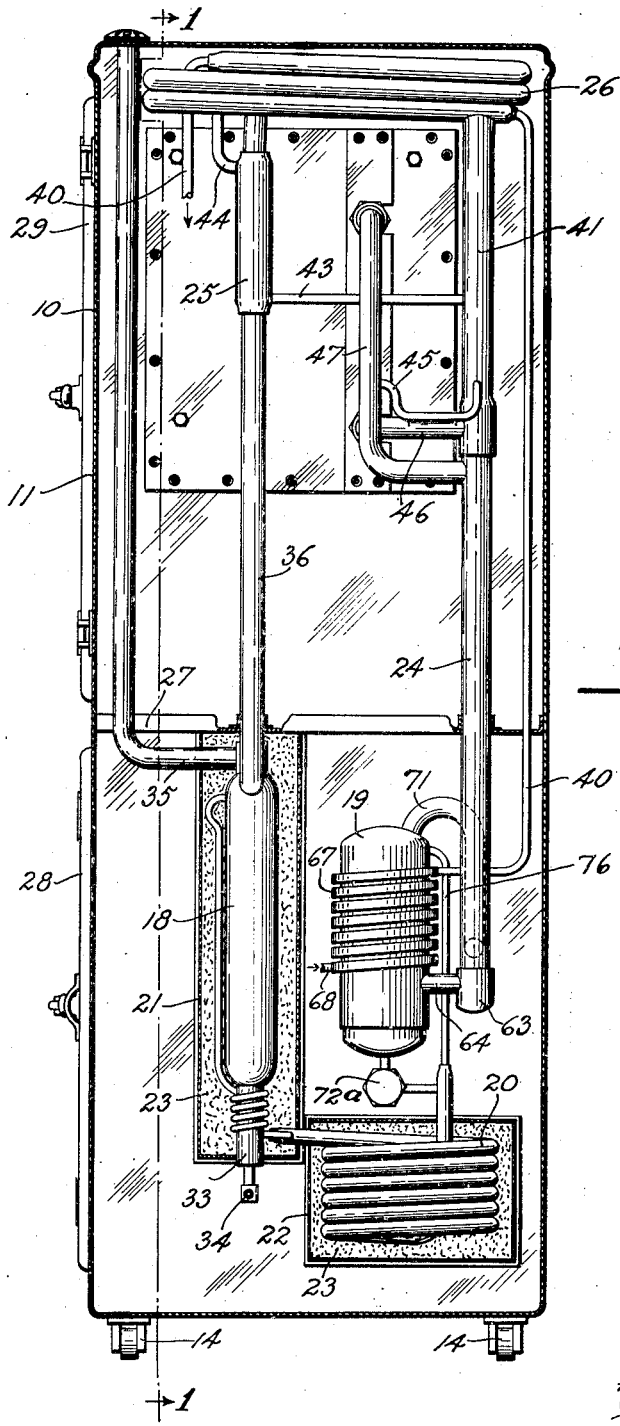
Fig. 2 is a side elevational view, partially in cross section, of the arrangement shown in Fig. 1 and is taken substantially on the line 2—2 of Fig. 1.

Referring more particularly to Figs. 1 and 2, reference character 10 designates generally a refrigerator cabinet suitable for use in a kitchen or elsewhere. Cabinet 10 comprises an outer metal shell 11, a layer of suitable heat insulating material 12, such as corkboard and a metal or porcelain lining 13. The cabinet may be mounted on castors 14.

Cabinet 10 is divided into a food storage compartment 15 and, on one side, a lower apparatus compartment 16 and an upper apparatus compartment 17. Compartment 17 is above compartment 16 and, for the greater part of its height, is somewhat narrower. Within compartment 16 is located a generator 18, an absorber 19, a liquid heat exchanger 20, the lower portion of a gas heat exchanger 24 and various conduits. Generator 18 and heat exchanger 20 (Fig. 2) are enclosed in sheet metal containers 21 and 22 respectively, which are packed with a suitable heat insulating material 23, such as, for instance, asbestos, which serves to reduce the amount of heat radiated from these members. Within compartment 17 is situated a rectifier 25, a condenser 26, the upper portion of gas heat exchanger 24 and various conduits. After the apparatus has been installed, the remaining space in compartment 17 is packed with a suitable heat insulating material, such as sheet corkboard, cut properly so as to fit around the apparatus therein.

The horizontal portion of an inverted L-shaped panel 27 separates compartments 16 and 17 and access may be had to both compartments by means of the removable side 9 of the cabinet. In the front of compartment 16, space is provided for a control panel (not shown) which includes water and electric or gas controls. As these controls are merely incidental to the invention and are known per se, they are not shown in the drawings. It is sufficient to say that they are accessible through an opening in the front of the cabinet which is normally closed by a door 28 (Figs. 2 and 9). Door 28 extends to the right hand edge of the cabinet 10 and comprises a portion 5 which is flush with the front of the cabinet and a portion 6, the outer surface of which is in the plane of the outer surfaces of doors 8 and 29. Door 28 is made in this manner for the sake of appearance obtained from a symmetry of design.

Food compartment 15 is provided with an upper door 29 and a lower door 8. A number of suitably located shelves 7 are supported within compartment 15 on which food may be placed. These shelves are preferably of wire open work so as to permit free circulation of air. An evaporator 30 set within a casting 31, which serves as a receptacle for a number of ice trays 32, is located in the upper part of compartment 15. This assembly comprises the chilling unit and serves to maintain a low temperature in the food compartment.

Figure 3:
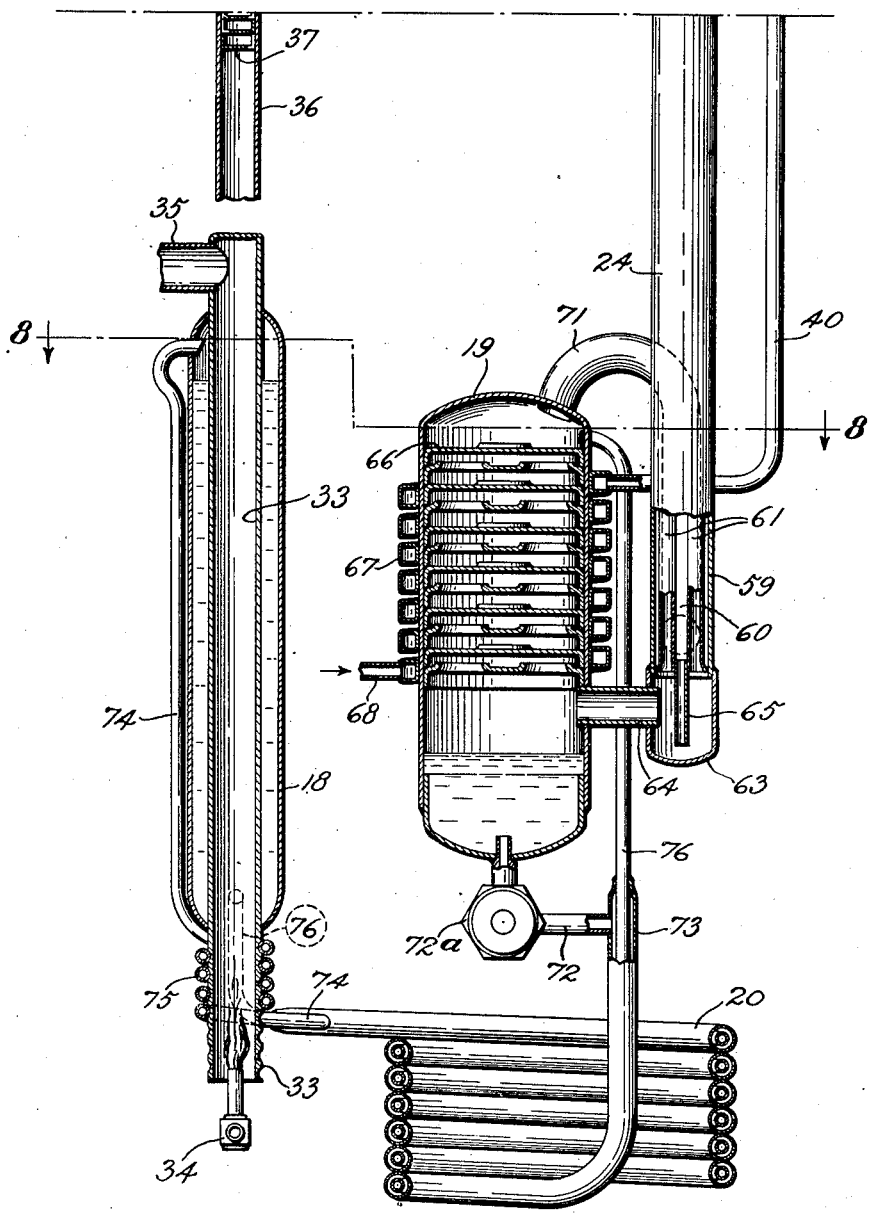
Fig. 3 is a side elevational view, partially in cross section, showing more or less in detail the lower portion of the apparatus shown in full in Fig. 2.
Figure 8:
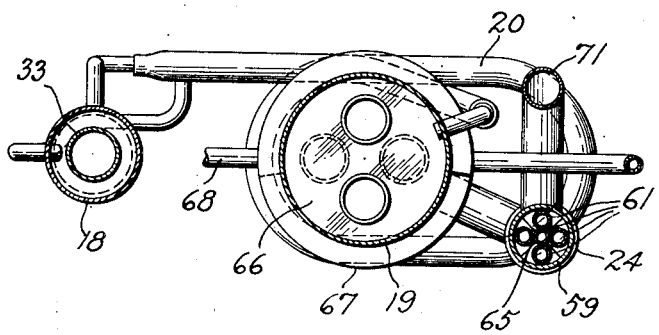
Fig. 8 is a plan view, partially in cross section, taken on the line 8—8 of Fig. 3.

Generator 18 (Figs. 2, 3 and 8) is provided with a centrally located flue 33. The generator is heated by any suitable means, as for instance the gas burner 34, which is placed so as to project its flame into flue 33. The products of combustion are carried out of the cabinet by an extension 35 of flue 33. Electric or other means of heating may be used in place of gas.

A vapor conduit 36 communicates with the upper part of generator 18 and passes upwardly therefrom and passes through and forms a porton of rectifier 25. A number of baffles 37 are situated within conduit 36 between the generator and rectifier. Another series of baffles 38 is placed in that portion of conduit 36 which passes within and forms part of rectifier 25. Baffles 37 and 38 are formed with apertures $37^a$ and $38^a$. Adjacent baffles are so placed that their apertures are out of line and thus a tortuous path is provided through conduit 36. The upper end of conduit 36 communicates with an outer conduit 39 of condenser 26.

Figure 6:
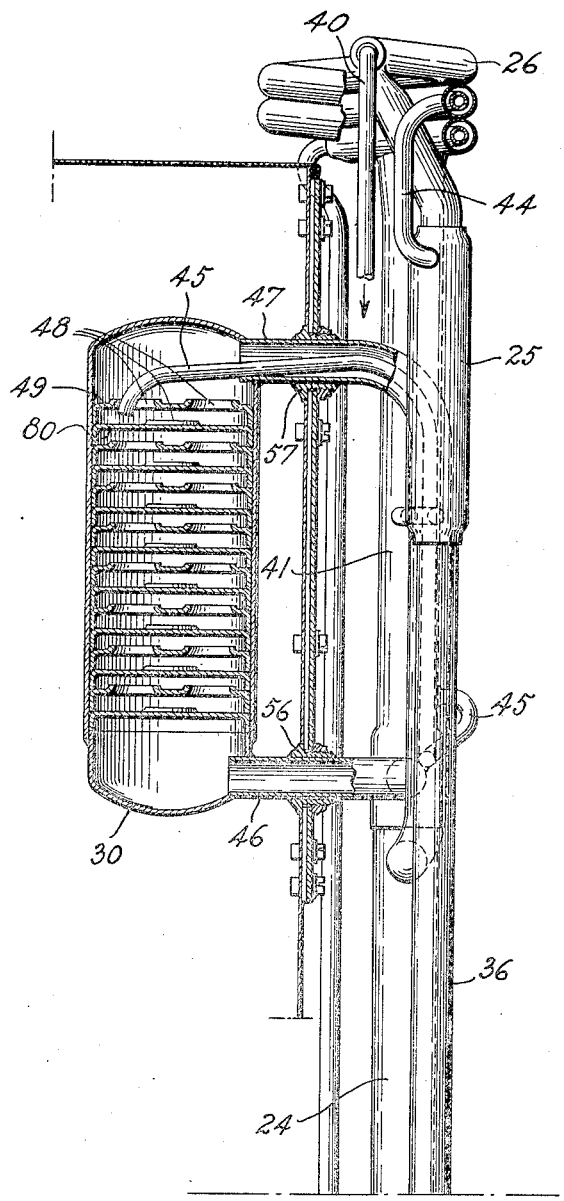
Fig. 6 is a front elevational view, partially in cross section, showing more or less in detail that portion of the apparatus shown in Fig. 4.
Figure 7:
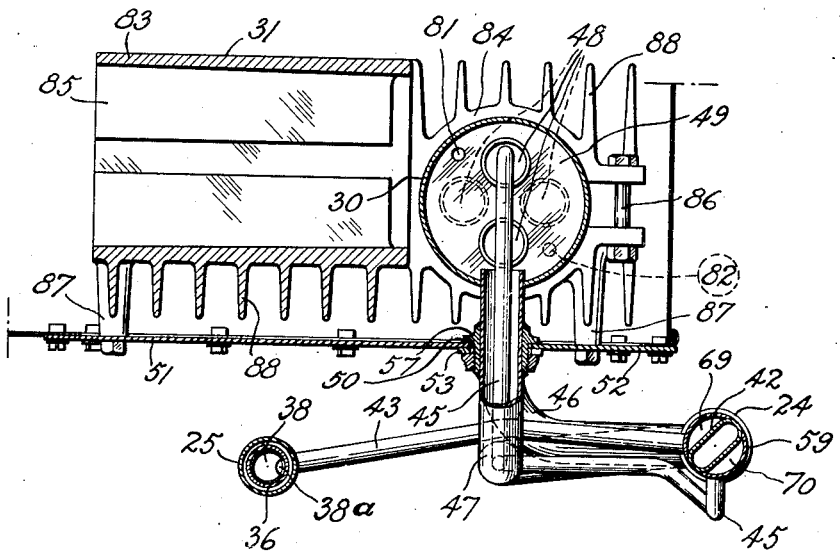
Fig. 7 is a plan view, partially in cross section, taken on the line 7—7 of Fig. 4.

Condenser 26 comprises an outer conduit 39 through which extends an inner cooling water conduit 40. The condenser is made in the form of an oblong coil which is placed in the upper part of compartment 17 in an enlarged portion thereof. The lower part of outer conduit 39 communicates with a vertically extending conduit 41 which serves as a refrigerant pre-cooler, the lower end of which is closed by an enlarged portion of conduit 42. That portion of conduit 42 which extends upwardly within conduit 41 has an oblong cross section (Fig. 7) and divides that portion of conduit 41 within which it extends into a liquid receiver 69 and a liquid passage 70 and is, in effect, a hollow partitioning member. A transversely disposed conduit 43 connects receiver 69 of conduit 42 with a space 4 of rectifier 25. Space 4 is formed between conduit 36 and a cylindrical member which is placed around conduit 36 and welded thereto at the top and bottom so as to form a closed annular space. A vapor conduit 44 connects the upper part of space 4 of rectifier 25 with the central turn of the outer conduit 39 of condenser 26. A liquid conveying conduit 45 communicates with the lower part of liquid passage 70 of conduit 41, extends for some distance in close proximity to a conduit 46 which conducts gaseous fluid from the evaporator and may be welded thereto, and thence extends for some distance within a conduit 47 supplying gaseous fluid to within evaporator 30. Within the evaporator, conduit 45 extends downwardly for some distance and passes through one of the apertures 48 in the topmost of a series of disks 49 and 80. Two sets of reference characters are given to the disks because alternate disks are of different kind. Disk 49 is formed with two oppositely disposed apertures 48 for passage of liquid as shown in Figs. 6 and 7. These apertures serve for the passage of gas and are of appreciable size. Each aperture 48 is provided with an upwardly directed rim which serves to prevent flow of liquid through the aperture. Disk 49 is also provided with a relatively small opening 81 which is placed at an angle of 45° with respect to a center line drawn through the centers of apertures 48.

The first of disks 80 figured in downward direction, which lies directly under the uppermost disk 49, is also formed with two apertures 48 having rims thereon. In assembled position, disk 80 is placed with its apertures 78 disposed at right angles to the apertures of disk 49. That is, a center line through apertures 48 of disk 49 lies at 90° to a center line through apertures 48 of disk 80. The small opening for passage of liquid through disk 80 is designated by reference character 82 and is so situated that openings 81 and 82 are 180° apart in assembled position. Opening 82 is also arranged at an angle of 45° with respect to a center line drawn through apertures 48 in disk 80 but lies on the opposite side of its adjacent aperture as regards the corresponding relation of opening 81 to its adjacent aperture. It is thus seen that alternate disks are of different formation. Alternate disks have the same relative position within the evaporator and it will be seen that, with the disks arranged as described, a tortuous passageway is formed both for gas passing downwardly through the evaporator and for liquid passing downwardly through the evaporator.

Figure 4:
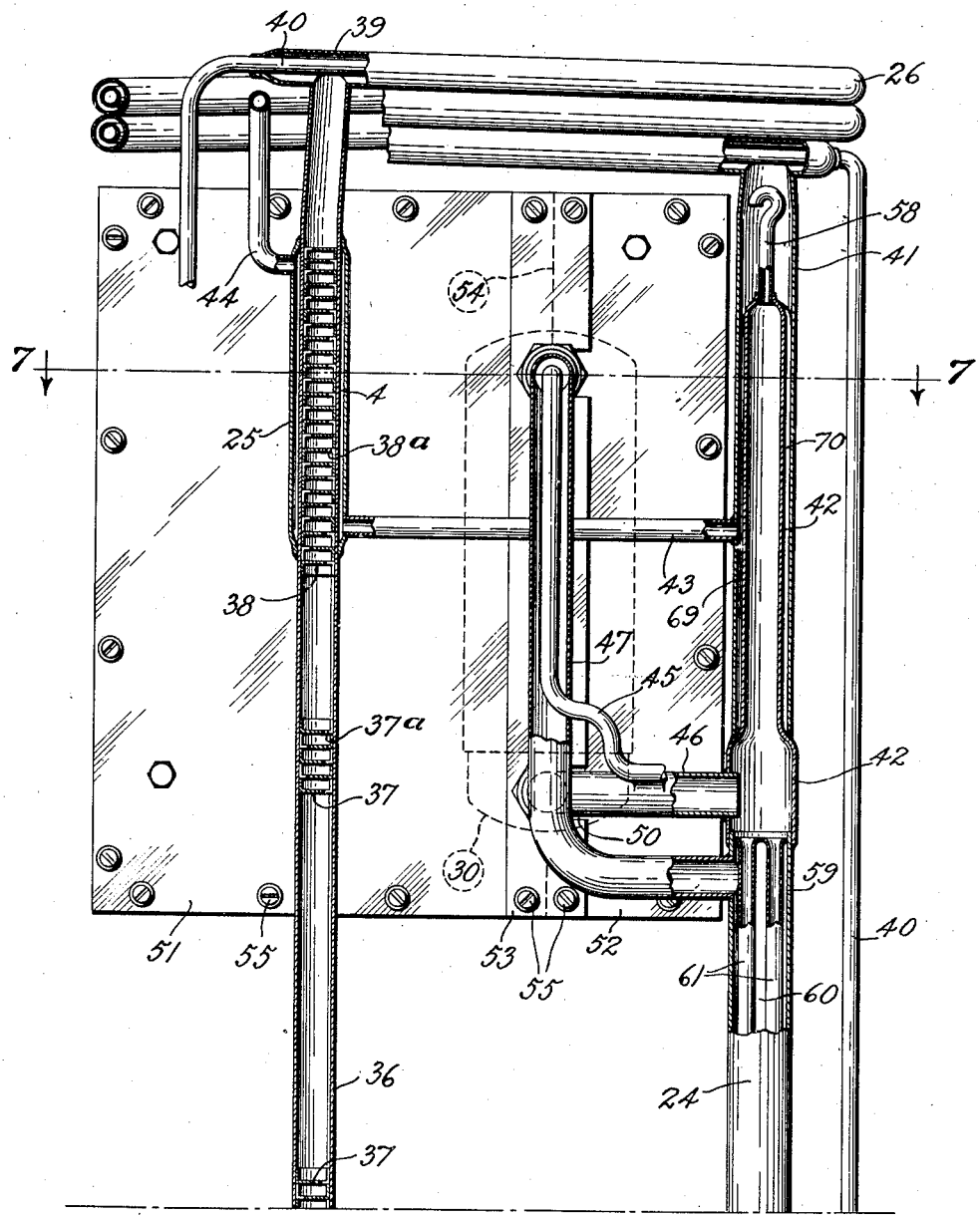
Fig. 4 is a side elevational view, partially in cross section, showing more or less in detail the upper portion of the apparatus shown in full in Fig. 2.

Evaporator 30 with its attendant casting 31 is supported by conduits 46 and 47 which pass through slots 50 in plate 51 and slots in plates 52 and 53 aligned with slots 50 where the parts are assembled. Plates 51 and 52 meet along the dotted line 54 (Fig. 4) and plate 53 covers this joint. The three plates are secured to the side of the food compartment by means of bolts 55. Conduits 46 and 47 are secured to the plates by means of unions 56 and 57 respectively. This arrangement facilitates the installation and removal of the apparatus. In installation, the apparatus is supported in position by the lower panel 27 and the plates 51 and 52 are put in place. The plate 53 is then put in place and the three plates are secured by bolts 55. The assembly is complete by tightening the unions 56 and 57. The plates 51, 52 and 53 thus close an aperture in the side of the cabinet of sufficiently large dimensions to allow the passage of the assembled chilling unit therethrough.

Casting 31 consists of a more or less box-shaped portion 83 and a cylindrical portion 84. The part 83 is in front of and extends above the top of cylindrical portion 84 and is horizontally partitioned by partitions 85 so as to form recesses to accommodate ice trays 32. Cylindrical portion 84 fits around evaporator 30 and is clamped thereto by one or more bolts 86. The casting is further supported by four arms 87 which are bolted to plates 51 and 52. One side of box-like portion 83 and the greater part of cylindrical portion 84 are provided with radiating fins 88.

Conduit 46 connects the lower part of the evaporator 30 with the lower enlarged portion of conduit 42. That portion of conduit 42 which has an oblong cross section extends upwardly within conduit 41. The upper end of conduit 42 communicates with a still smaller conduit 58 which extends upwardly for some distance within conduit 41 and ends in the form of a goose-neck bend. The upper end of conduit 58 thus opens downward so that liquid passing downwardly in conduit 41 will not enter conduit 58 while at the same time an unrestricted passage for vapor is provided between conduits 41 and 42.

The lower end of conduit 42 is secured to an outer shell 59 of the vertical tubular gas heat exchanger 24 in any suitable manner, as, for instance, by welding. Within shell 59 are placed a number of tubes 61, the upper ends of which are flared and welded to each other and to shell 59 so as to prevent the passage of fluid from conduit 42 into space 60 formed within conduit 59 around tubes 61. Tubes 61 extend within shell 59 to its lower end where they are flared and welded but in this case a tube 65 extends through the weld. A cap-like member 63 is secured to the lower end of shell 59. Some distance above the bottom of member 63 a conduit 64 communicates therewith and with the lower part of absorber 19. Tube 65 extends through the weld at the lower end of tubes 61 from a point a short distance thereabove to a point within member 63 below the lower side of conduit 64.

Absorber 19 consists of a closed cylindrical member in which are positioned a series of disks 66 which may be similar to disks 49 in evaporator 30. A cooling coil 67 is formed in a spiral around absorber 19 and preferably has a square cross section and is welded to the absorber in order to secure good heat transfer conditions. Cooling water is supplied to spiral 67 through a conduit 68 and is discharged therefrom through conduit 40. Conduit 40 extends within outer conduit 39 of condenser 26 and finally discharges to a sewer or other convenient place.

A conduit 71 connects the upper part of absorber 19 with the lower part of space 60 of shell 59. Conduit 47 connects the upper part of space 60 with the upper part of evaporator 30.

Figure 5:
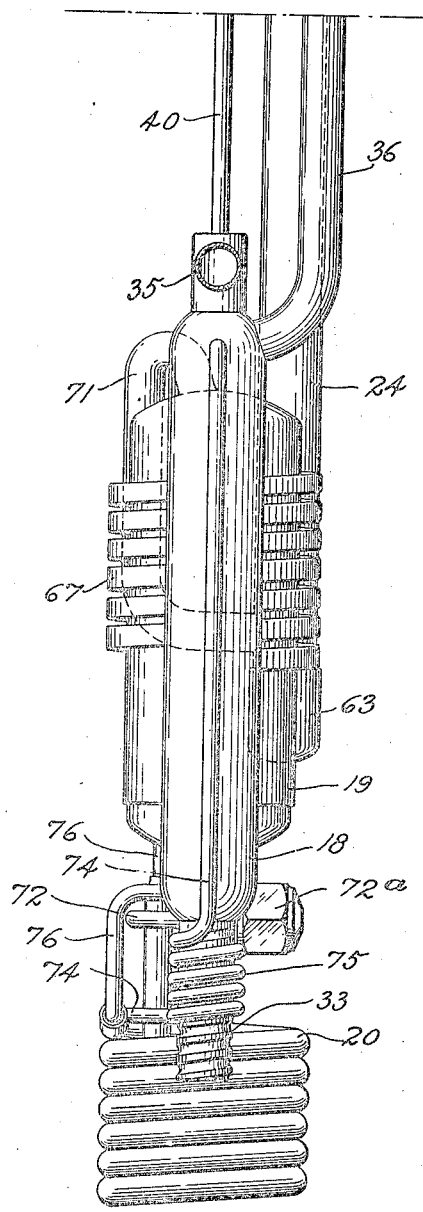
Fig. 5 is a front elevational view showing more or less in detail that portion of the apparatus shown in Fig. 3.

A conduit 72 connects the bottom of absorber 19 with one end of an outer conduit 73 of liquid heat exchanger 20. A filling plug 72ª is placed in conduit 72 through which the apparatus is charged. Heat exchanger 20 is in the form of an oblong coil. A conduit 74 communicates with the other end of conduit 73, is formed in a spiral coil 75 around the lower end of flue 33 and thence extends upwardly and communicates with the upper part of generator 18. A conduit 76 (Fig. 5) communicates with the lower part of generator 18, extends within outer conduit 73 of heat exchanger 20 and communicates with the upper part of absorber 19.

The operation of the apparatus is as follows:

A solution of a refrigerant, for instance ammonia, dissolved in an absorbing medium, for instance water, is contained in generator 18. The application of heat thereto from gas burner 34 serves to drive the ammonia out of solution and it passes as a vapor upwardly through conduit 36 carrying along with it some water vapor. On its passage up conduit 36 the mixture of ammonia and water vapor is cooled by radiation of heat to the atmosphere and part of the water vapor is condensed to a liquid and deposited on baffles 37 and runs back to the generator. The remaining water vapor is condensed in that portion of conduit 36 which is within rectifier member 25 and which is cooled by liquid ammonia in that member. The water thus formed also runs back to generator 18. The now dry ammonia vapor passes into outer conduit 39 of condenser 26 where its temperature is reduced sufficiently by the cooling water in conduit 40 to effect its liquidation. The liquid ammonia thus formed flows by gravity downwardly through conduit 39 and therefrom into conduit 41.

The liquid ammonia which passes downwardly through conduit 41 is divided into two portions by conduit 42 of oblong cross section which serves as a partition. One portion passes into liquid receiver 69 while the remainder passes into passage 70. The ammonia that passes into receiver 69 collects therein and passes through conduit 43 and substantially fills rectifier space 4. The absorption of heat by this liquid ammonia in the rectifier from the hot vapor passing up through conduit 36 vaporizes a portion of it and the vapor thus formed passes through conduit 44 to condenser 26 where it is recondensed. If liquid ammonia is supplied to liquid receiver 69 faster than it is vaporized in rectifier 25 it fills receiver 69 to the top and spills around the upper end of conduit 42 into passage 70.

The liquid ammonia which enters passage 70, either directly from condenser 26 or by spilling over from receiver 69, passes downwardly therethrough and through conduit 45 to the upper part of evaporator 30. The liquid level in passage 70 is substantially the same as and is determined by the level of the highest point in conduit 45. In the evaporator the liquid ammonia is distributed over disks 49 and is thus brought into intimate contact with a gas, inert with respect to ammonia, for instance hydrogen, which is introduced through conduit 47. The ammonia evaporates in the presence of and diffuses into the hydrogen and the evaporation produces refrigeration in compartment 15 in which evaporator 30 is situated and in the ice trays. The mixture of ammonia and hydrogen vapor thus formed has a greater specific weight than the relatively pure hydrogen which enters through conduit 47 and the mixture passes downwardly through the evaporator and through conduit 46 to conduit 42. In order to assure the starting of the circulation in this direction, that is downwardly through the evaporator rather than downwardly through conduit 47 as might conceivably be the case, conduit 45 is extended below the uppermost disk 49. Thus at starting, before the hydrogen circulation has commenced, diffusion of ammonia into conduit 47 is greatly retarded while its diffusion downward through the evaporator is accelerated and hence the circulation of ammonia and hydrogen is started downwardly through the evaporator and continues in this direction.

The mixture of ammonia and hydrogen which enters conduit 42 fills that conduit and passes downwardly through tubes 61 to cap-like member 63 from which it passes through conduit 64 to the lower part of absorber 19. The mixture in conduit 42 cools the ammonia in chambers 69 and 70 adjacent thereto. Hence the ammonia in chamber 69 is further cooled before it passes through conduit 43 to rectifier member 25 which assures complete rectification and the ammonia in chamber 70 is precooled before it enters the evaporator.

Within the absorber the mixture comes in intimate contact with water which contains but relatively little ammonia in solution. This water is introduced near the top of the absorber through conduit 76 and passes downwardly over disks 66. The water absorbs the ammonia from the mixture and the relatively light hydrogen, being non-absorbable by water, passes upwardly through absorber 19 and through conduit 71 to the lower end of space 60 in heat exchanger 24.

There is a possibility of liquid collecting in the lower part of space 60 either from the condensation of water vapor, which may pass from the absorber through conduit 71, or from water flowing there when the apparatus is tipped as in transit. If no provision were made for the removal of this liquid it would form a liquid seal and prevent the circulation of the hydrogen. Hence tube 65 is placed so as to drain space 60. The liquid that passes through tube 65 collects in member 63 until it has risen to the level of conduit 64 when it flows therethrough to absorber 19. As the lower end of tube 65 is below the bottom of conduit 64, it is submerged in the liquid in member 63 and hence a liquid seal is formed which prevents the passage of gas or vapor through tube 65.

The hydrogen passes upwardly through space 60 and is precooled before entering the evaporator through conduit 47 by the ammonia-hydrogen mixture in tubes 61 which has just left the evaporator. The cooled hydrogen which enters the top of the evaporator again mixes with ammonia and repeats its cycle.

The strong solution formed in the absorber by the absorption of the ammonia by the water passes therefrom through conduit 72 to outer conduit 73 of liquid heat exchanger 20. From conduit 73 the solution passes through conduit 74 to spiral coil 75. Here the application of heat from gas burner 34 vaporizes a portion of the liquid and causes circulation of the liquid and vapor thus formed upwardly through conduit 74 to the upper part of generator 18. This circulation is the result of well known thermo-siphonic action.

In the generator the ammonia is again driven out of solution by the application of heat and the weakened solution passes downwardly therethrough and through conduit 76 to the upper part of absorber 19. This flow is a result of gravity as the thermo-siphon maintains the liquid level in generator 18 above the upper end of conduit 76 in absorber 19. In heat exchanger 20 the relatively cool strong solution flowing in outer conduit 73 to the generator is preheated by the hot weak solution in conduit 76 which has just left the generator. This weak solution may be further cooled, if desired, by placing a portion of conduit 76 in heat exchange relation with cooling water coils 67.

A small amount of hydrogent may be absorbed by the water in the absorber and carried into the generator where it is driven out of solution along with the ammonia. As it is uncondensable at the temperatures and pressure existing in the apparatus it passes through conduit 36 and condenser 26 as a gas and tends to collect and form a gas pocket in the upper part of conduit 41. To prevent the formation of such a gas pocket, conduit 58 is provided, which allows hydrogen which has collected in conduit 41 to pass therefrom into conduit 42 and to its proper place in the system.

Amongst the advantages of our invention, the following may be noted:

A strong and definite circulation of air is obtained within cooling compartment 15 by placing evaporator 30 and its attendant casting 31 at one side in the upper part of the compartment. Thus the air chilled by contact with the evaporator assembly passes downwardly along one side of the compartment while the warmer air passes upwardly along the opposite side. In this way the air is caused to follow a definite path and eddies are, to a great degree, eliminated. Placing the evaporator on one side is also advantageous from a point of food storage capacity. The space beside the evaporator is thus made available for the storage of food.

The apparatus itself, from an operating point of view, possesses some unique advantages. The large vertical distance between the evaporator and absorber results in a strong circulation of gases between these two members due to the comparatively great difference in weight between the ammonia-hydrogen column on the one hand and the hydrogen column on the other. A strong circulation in this case is to be desired as it causes a more rapid evaporation and hence a more efficient apparatus. The efficiency of the apparatus constructed according to our invention is further improved by the excellent heat exchange obtained between the ammonia-hydrogen gaseous mixture and the hydrogen gas due to the length of the heat exchanger it is possible to employ.

As has been noted, the absorption apparatus extends practically from the bottom to the top of the cabinet but is rigidly secured to the member 27 and to the members 51, 52 and 53. The entire apparatus is hermetically sealed, thus precluding the possibility of any leaks, and it may be easily removed as a unit by removing a few screws.

Thus it is seen that our apparatus occupies a minimum of space and secures a maximum of efficiency and convenience by extending the entire height of the cabinet while being easily removable as one hermetically sealed unit. All of the controls are easily accessible by means of the door 28.

While we have shown and described a more or less detailed form of our invention, it is to be clearly understood that we are not limited to the form of apparatus shown and described.

Having thus described our invention, what we claim is:

1. A refrigerator including an absorption refrigerating system comprising an upper apparatus compartment and a lower apparatus compartment, an absorber in the lower compartment, a condenser in the upper compartment, a vertically extending tubular heat exchange member connected to said absorber at its lower end and to said condenser at its upper end and situated within both of said compartments, said heat exchange member being formed to provide separate gas spaces in heat transfer relation and a liquid receiver formed to one side of an extension to one of said spaces.

2. A refrigerator including an absorption refrigerating system comprising an upper apparatus compartment and a lower apparatus compartment, an absorber in the lower compartment, a condenser in the upper compartment, a vertically extending tubular heat exchange member connected to said absorber at its lower end and to said condenser at its upper end and situated within both of said compartments, said heat exchange member being formed to provide separate gas spaces in heat transfer relation and a liquid receiver formed to one side of one of said spaces.

3. A refrigerator including an absorption refrigerating system comprising an upper apparatus compartment and a lower apparatus compartment, an absorber in the lower compartment, a condenser in the upper compartment, a vertically extending tubular heat exchange member connected to said absorber at its lower end and to said condenser at its upper end and situated within both of said compartments, said heat exchange member having a plurality of separated gas spaces, a liquid receiver in heat transfer relation with one of the gas spaces and a vent communication between the liquid receiver and one of the gas spaces.

4. A refrigerator including an absorption refrigerating system comprising an upper apparatus compartment and a lower apparatus compartment, an absorber in the lower compartment, a condenser in the upper compartment, a vertically extending tubular heat exchange member connected to said absorber at its lower end and to said condenser at its upper end and situated within both of said compartments, said heat exchange member having a plurality of separated gas spaces, a liquid receiver in heat transfer relation with one of the gas spaces and a vent communication between the liquid receiver and the gas space in heat transfer relation therewith.

5. Refrigerating apparatus comprising an interconnected system including a generator, a condenser, a rectifier, an absorber, an evaporator, means to conduct gaseous fluid from said evaporator to said absorber, means to conduct liquid from said condenser to said rectifier and means to conduct heat from said liquid to said gaseous fluid to precool said liquid before entering the rectifier.

6. Refrigerating apparatus comprising an interconnected system including a generator, a rectifier, a condenser, a liquid receiver, an evaporator, an absorber, a heat exchange member having a gas space in heat exchange relation with said liquid receiver and means to conduct liquid from said receiver to said rectifier.

7. Refrigerating apparatus comprising an interconnected system including a generator, a rectifier, a condenser, a liquid receiver, an evaporator, an absorber, a heat exchange member having a gas space in heat exchange relation with said liquid receiver and a vent connection between the upper part of said liquid receiver and said gas space.

8. In an absorption refrigerating apparatus, a condenser, means to supply vapor to said condenser, a rectifier operating to separate an entrained product from the fluid supplied to the condenser, a hollow element extending downwardly from the lower part of the condenser, a hollow partitioning member extending within said element and forming a liquid receiver and a liquid passage, an evaporator, a connection between said evaporator and said passage, a connection between said rectifier and said receiver and means for introducing gaseous fluid into said hollow partitioning member.

9. In an absorption refrigerating apparatus, a condenser, means to supply vapor to said condenser, a rectifier operating to separate an entrained product from the fluid supplied to the condenser, a hollow element extending downwardly from the lower part of the condenser, a hollow partitioning member extending within said element and forming a liquid receiver and a liquid passage, an evaporator, a connection between said evaporator and said passage, a connection between said rectifier and said receiver and means for introducing gaseous fluid into said hollow partitioning member, said passage constituting a liquid overflow receptacle for said receiver.

10. In an absorption refrigerating apparatus, a condenser, means to supply vapor to said condenser, a rectifier operating to separate an entrained product from the fluid supplied to the condenser, a hollow element extending downwardly from the lower part of the condenser, a hollow partitioning member extending within said element and forming a liquid receiver and a liquid passage, an evaporator, a connection between said evaporator and said passage, a connection between said rectifier and said receiver, means for introducing gaseous fluid into said hollow partitioning member and a vent at the upper end of said hollow partitioning member communicating with the space within the hollow element above the liquid receiver.

11. In an absorption refrigerating apparatus, a condenser, means to supply vapor to said condenser, a rectifier operating to separate an entrained product from the fluid supplied to the condenser, a hollow element extending downwardly from the lower part of the condenser, a hollow partitioning member extending within said element and forming a liquid receiver and a liquid passage, an evaporator, a connection between said evaporator and said passage, a connection between said rectifier and said receiver, means for introducing gaseous fluid into said hollow partitioning member and a goose-neck vent at the upper end of said hollow partitioning member communicating with the space within the hollow element above the liquid receiver.

12. In an absorption refrigerating apparatus, a condenser, means to supply vapor to said condenser, a rectifier operating to separate an entrained product from the fluid supplied to the condenser, a hollow element extending downwardly from the lower part of the condenser, a hollow partitioning member extending within said element and forming a liquid receiver and a liquid passage, an evaporator, a connection between said evaporator and said passage, a connection between said rectifier and said receiver, a gas connection between said evaporator and the inside of said hollow partitioning member and a vent at the upper end of said hollow partitioning member communicating with the space within said hollow element above the liquid receiver.

13. In an absorption refrigerating apparatus, a vertically extending vapor conduit, a vertically extending heat exchanger, a rectifier formed in part by said vapor conduit, a vertically extending liquid receiver vertically above and in line with said heat exchanger, a condenser extending substantially horizontally between the upper parts of said vapor conduit and said receptacle and connecting the same and a liquid conveying conduit connecting said rectifier with said receiver.

14. Refrigerating apparatus comprising an interconnected system including a generator, a condenser, an evaporator, an absorber, means to circulate gaseous fluid between and through the evaporator and absorber comprising a heat exchanger having separated spaces and a liquid drain from one space to another arranged to form a pool of liquid to comprise a liquid seal between the spaces.

15. Refrigerating apparatus comprising an interconnected system including a generator, a condenser, an evaporator, an absorber, means to circulate gaseous fluid between and through the evaporator and absorber comprising a heat exchanger having separated spaces, the lower part of one of said spaces being formed by a member adapted to hold liquid, a conduit connected to said member above the bottom thereof and connected to the absorber and a conduit communicating at one end with said one of said spaces within said member below the connection of said conduit therewith and at the other end with another of said spaces.

16. Refrigerating apparatus comprising an interconnected system including a generator, an absorber, an evaporator, a condenser, a vertical heat exchange member connected at the bottom to said absorber and at the top to said condenser, a series of tubes in said heat exchange member separating gas spaces, a drain conduit between said spaces at the lower part of said heat exchange member, said heat exchanger being arranged to form a liquid seal at the lower end of said drain conduit and connections between said evaporator and the spaces separated by the tubes.

17. Refrigerating apparatus comprising an interconnected system including a generator, a condenser, an absorber, an evaporator and means to circulate gaseous fluid between and through the absorber and evaporator comprising a vertically disposed heat exchange member, said heat exchange member serving as a support for said condenser.

18. In an absorption refrigerating apparatus, a vertically extending vapor conduit, a vertically extending heat exchange member and a condenser extending substantially horizontally between and connecting said vapor conduit and said heat exchange member, said vapor conduit and heat exchange member acting as supports for said condenser.

19. A refrigerator including a cabinet and an absorption refrigerating apparatus for cooling the same, said cabinet having an internal food space, a lower apparatus compartment and a narrower upper apparatus compartment to one side of the food space, the food space having a widened upper portion beside the upper apparatus compartment, a chilling unit in the widened portion of the food space comprising an evaporator, a heat absorbing member surrounding the evaporator having a series of openings for ice trays, said openings being arranged in front of said evaporator, an absorber in the lower apparatus compartment, a condenser in the upper apparatus compartment and a vertically extending heat exchange member connecting said absorber and said condenser and situated within both of said apparatus compartments, said condenser and said heat exchange member being connected to said evaporator.

20. In an absorption refrigerating apparatus, a generator, a condenser disposed above the generator, a vertically extending conduit connecting the generator and one end of said condenser, a vertically extending refrigerant cooler, said refrigerant cooler comprising an outer conduit communicating with said condenser, an inner conduit of oblong cross-section dividing said outer conduit into a first chamber and a second chamber, a conduit connecting said inner conduit with the interior of said outer conduit and opening downwardly in said outer conduit, a horizontally extending conduit connecting said first chamber of said refrigerant cooler with said rectifier member, a conduit connecting said rectifier member with said condenser, a series of baffles within that portion of said vertically extending conduit within said rectifier member, an evaporator, a conduit connecting said second chamber of said refrigerant cooler with said evaporator and a conduit connecting said evaporator with said inner conduit of said refrigerant cooler.

21. In an absorption refrigerating apparatus, an evaporator, a liquid conduit for supplying liquid refrigerant thereto, a gas conduit connected to the upper part of the evaporator for supplying gas thereto, a series of superimposed members in said evaporator below said gas conduit, said liquid conduit being arranged to open below one of said members.

22. Refrigerating apparatus comprising an interconnected system including a generator, a condenser, a rectifier, an absorber, an evaporator, means to conduct vaporous refrigerant from said generator to said rectifier, means to liquefy said vaporous refrigerant in said condenser, means whereby liquid refrigerant cools said vapor in said rectifier, and additional means to cool said liquid refrigerant before entering the rectifier due to cooling produced within the system.

23. Refrigerating apparatus comprising an interconnected system including a generator, a condenser, a rectifier, an absorber, an evaporator, a liquid receiver connected to said rectifier, means to conduct vaporous refrigerant to said rectifier, means to supply liquid refrigerant to said receiver and said rectifier, whereby the liquid refrigerant supplied to said rectifier rectifies the vaporous refrigerant therein and means to cool the refrigerant in said receiver due to cooling produced within the system.

24. Refrigerating apparatus comprising an interconnected system including a generator, a condenser, a rectifier, an absorber, an evaporator, a liquid receiver, said rectifier having a vapor conduit and a refrigerant space in heat exchange relation therewith, means to supply vaporous refrigerant to said vapor conduit, means to supply liquid refrigerant to said receiver, means connecting said receiver with said refrigerant space and means to cool the refrigerant in said receiver.

25. In an absorption refrigerating apparatus, a condenser, means to supply vapor to said condenser, a rectifier operating to separate an entrained product from the fluid supplied to the condenser, a hollow element extending downwardly from the lower part of the condenser, a partitioning member extending within said hollow element and forming a liquid receiver and a liquid passage, an evaporator, a connection between said evaporator and said passage, a connection between said rectifier and said receiver and means for cooling the liquid in said passage and said receiver.

26. In an absorption refrigerating apparatus, a condenser, means to supply refrigerant fluid to said condenser, a rectifier operating to separate an entrained product from the fluid supplied to said condenser, a hollow element extending downwardly from the lower part of the condenser, a partitioning member extending within said hollow element and forming a liquid receiver and a liquid passage, an evaporator, means to conduct liquid refrigerant from said passage to said evaporator, a connection between said rectifier and said receiver, means for cooling the liquid in said passage and said receiver and means to introduce an inert gas into said evaporator in the presence of which said liquid refrigerant therein evaporates.

27. In an absorption refrigerating apparatus, a condenser, means to supply refrigerant fluid to said condenser, a rectifier operating to separate an entrained product from the fluid supplied to the condenser, a hollow element extending downwardly from the lower part of the condenser, a hollow partitioning member extending within said element and forming a liquid receiver and a liquid passage, an evaporator, means to conduct liquid refrigerant from said passage to said evaporator, a connection between said rectifier and said receiver, means to introduce an inert gas into said evaporator in the presence of which said liquid refrigerant therein evaporates and means for introducing gaseous fluid into said hollow partitioning member.

28. In an absorption refrigerating apparatus, a condenser, means to supply refrigerant fluid to said condenser, a rectifier operating to separate an entrained product from the fluid supplied to the condenser, a hollow element extending downwardly from the lower part of the condenser, a hollow partitioning member extending within said element and forming a liquid receiver and a liquid passage, an evaporator, means to conduct liquid refrigerant from said passage to said evaporator, a connection between said rectifier and said receiver, means for introducing an inert gas into the evaporator in the presence of which the liquid refrigerant therein evaporates, means for introducing gaseous fluid into said hollow partitioning member and a vent at the upper end of said hollow partitioning member communicating with the space within the upper part of said hollow element to permit the passage therefrom of said inert gas.

29. Refrigerating apparatus comprising an interconnected system including an absorber, an evaporator, a condenser, a vertical heat-exchange member connected at the bottom to said absorber and at the top to said condenser, a series of tubes in said heat exchange member forming separate gas spaces, a drain conduit between said spaces at the lower part of said heat exchange member, said heat exchange member being arranged to form a liquid seal at the lower end of said drain conduit and connections between said evaporator and the spaces separated by the tubes, said evaporator, heat exchange member and absorber forming a cycle of circulation for an inert gas.

In testimony whereof we hereunto affix our signatures.

BALTZAR CARL von PLATEN.
CARL GEORG MUNTERS.